Feb. 28, 1939.  R. L. STIFFLER  2,148,658
VEHICLE WHEEL
Filed Nov. 18, 1937
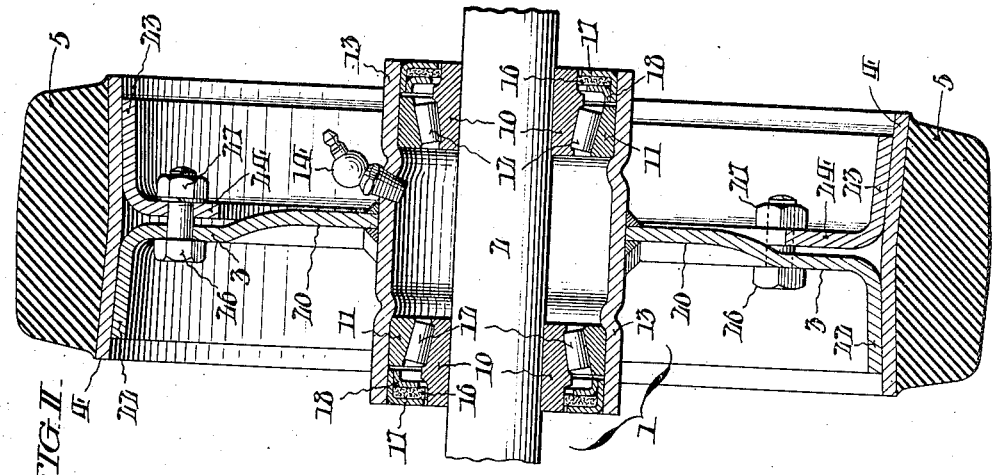
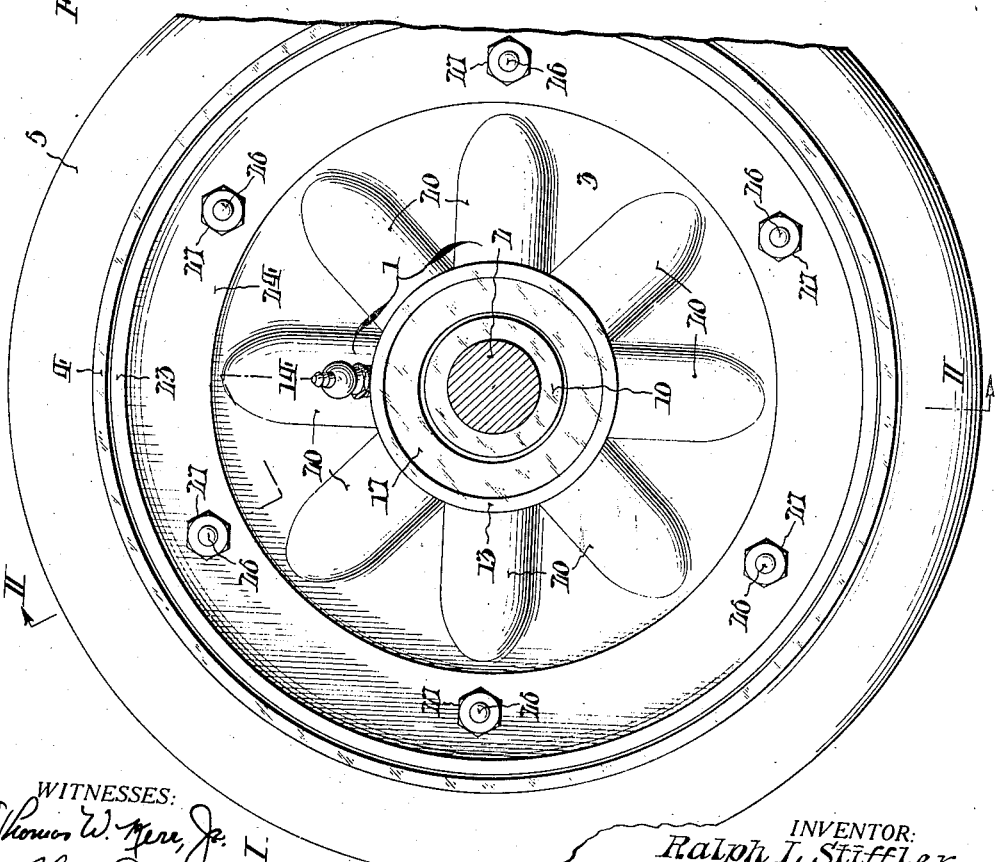
INVENTOR:
Ralph L. Stiffler,
BY
ATTORNEYS.

Patented Feb. 28, 1939

2,148,658

UNITED STATES PATENT OFFICE 2,148,658

VEHICLE WHEEL

Ralph L. Stiffler, Lansdowne, Pa.

Application November 18, 1937, Serial No. 175,206

2 Claims. (Cl. 301—11)

My invention relates generally to wheel structures and more particularly to wheel structures having demountable rims on which tires are mounted.

My invention is directed toward the problem of simple and easy replacement of worn tires on the rubber-tired trucks which are in use about railway stations and in other industrial uses. It is important that the change of tires be accomplished quickly and without extensive and heavy apparatus. The pressed-on type of tire which is frequently met with in industry limits tire changing to stations having the necessary apparatus which cannot be widely distributed due to cost factors.

My invention provides a rugged wheel structure which permits quick and efficient tire change without special apparatus and this is its main object. Other objects of my invention are simplicity of assembly and of manufacture. Still other advantages will appear from the following detailed description of a preferred embodiment of my invention, reference being had to the accompanying drawing.

Fig. I of the drawing shows a partial side elevation of a wheel constructed according to my invention.

Fig. II is a section taken as indicated by the arrows II—II of Fig. I.

In the drawing there is shown a wheel equipped with a roller bearing of a conventional type which need not be described in detail. The wheel consists of a hub 1 mounted rigidly on an axle 2, a disc portion 3 mounted on the hub 1, and a rim member 4 having a tire 5 attached thereto.

The hub 1 consists of two circular elements 10 rigidly attached to and spaced longitudinally along the axle 2. These elements 10 support similar elements 11 by means of rollers 12 positioned between the elements 10 and 11. The elements 11 are rigidly attached to the inside of the cylindrical element 13 which is the hub proper. It will be noted that a circular area is formed around the axle 2 and confined within the cylindrical element 13 by the elements 10 and 11 at the ends of the hub 1. This space is for lubrication purposes and the lubricating substance is forced into it through a valve fitting 14.

In order to prevent the lubricating substance from running out from the rollers 12 over the wheel surface, a retaining ring 16 of felt or of a similar substance is provided. This ring 16 is in easy contact with the surface of the element 10 and is held in place between two metal retaining rings 17 and 18 which are in turn supported by a pressed fit within element 13 as shown.

The disc portion 3 has strengthening ribs 20 formed therein and radiating from the hub 1 in a manner suggesting the spokes of a wheel. The circumferential edge of the disc portion 3 is bent over and formed into an annular flange 22 which is duplicated on the other side of the disc portion 3 by an annular flange 23 formed on a removable ring 24. The ring 24 is secured to the disc portion 3 by a fastening means composed of bolts 26 and nuts 27 with lock washers of a usual type. The flanges 22 and 23 incline downward toward each other so that the outside edges of the flanges 22 and 23 are higher than the inner edges of the flanges 22 and 23. The angle which these flanges 22 and 23 make with the longitudinal axis of the wheel is comparatively small in order to provide full support for the rim member 4 which is correspondingly formed to fit the flanges 22 and 23. In the illustrated embodiment of my invention, the angle of the flanges 22 and 23 with the wheel axis is about 9°. The size of the rim member 4 is such that the removable ring 24 cannot be drawn up to a contacting relation with the disc portion 3. This insures a tight retaining fit for the rim member 4 as the bolts 26 and nuts 27 are taken up. The rim member 4 has a tire 5 of rubber or similar substance. If rubber is the material chosen, the tire 5 is vulcanized to the rim member 4. Of course any other means well known in the art for attaching the tire 5 to the rim member 4 could be used instead of vulcanizing.

The operation of my invention follows clearly from the above description but a few further comments may further clarify the advantages thereof. When it is desired to change a tire, one of the spare rim members 4 having a tire 5 is taken to the truck for the tire change. Then the nuts 27 and bolts 26 of the wheel in question are unscrewed and the removable ring 24 is easily taken off. Any slight binding is relieved by inserting a screw driver or similar tool into the space between the disc portion 3 and the ring 24 and prying the ring 24 loose. A few taps will then loosen the rim member 4 which is then removed. The new rim member 4 with the new tire is positioned on the flange 22 and tapped into a snug fit. The ring 24 is then replaced and the nuts 27 and bolts 26 tightened up. The change is then complete. No special tools are required and the change occupies but a few minutes. The importance of the small inclination of the flanges 22 and 23 must not be overlooked. If a deep pronounced V-surface were provided by the flanges 22 and 23, the advantages of a pressed fit would be missed. My invention has the advantage of firmly supporting the rim carrying the tire like a pressed fit assembly but without the difficulties in changing tires which are inherent in the pressed fit assembly. There is no tendency for the rim member 4 to pry the two flanges 22 and 23 apart under an unusually heavy weight on the vehicle.

While I have described in detail a preferred form of my invention, it will be obvious to one skilled in the art that numerous changes may be made therein without departing from the spirit of my invention as hereinafter claimed.

Having thus described my invention, I claim:

1. In a vehicle wheel the combination of a hub, a disc portion embodying dished radial strengthening ribs surrounding said hub and simulating spokes, an annular flange formed around the circumferential edge of said disc portion, a removable ring attached to said disc portion having an opposingly directed flange to said first mentioned flange, said flanges each inclining inward from their respective circumferential edges to provide a shallow V-shaped surface, the angles of said flanges with the wheel axis being comparatively slight, a tire supporting rim mounted on said flanges and having its inner contacting surface conforming substantially in shape to said shallow V-shaped surface formed by said flanges, and the removable ring being of a size to prevent contact relation with the disc portion when the said parts are assembled and secured together.

2. A vehicle wheel as defined in claim 1 wherein the annular flange formed around the edge of the wheel disc portion is inclined approximately at an angle of nine degrees with respect to the axis of the wheel, an opposing removable ring includes a radial portion with a similarly inclined flange formed around its circumferential edge, bolts passed through holes in the ring radial portion attach the latter to the wheel disc portion in spacial relation with capacity for removal, and the tire supporting rim is formed to correspond with the inclination of said flanges.

RALPH L. STIFFLER.